United States Patent [19]

Thenery

[11] Patent Number: 4,806,743
[45] Date of Patent: Feb. 21, 1989

[54] INSTALLATION FOR MANAGING THE "VISITOR" RESOURCE AT A TRADE SHOW, OR FAIR, OR THE LIKE

[76] Inventor: Jean-Jacques Thenery, 4 rue de l'Amandier, 78400 Chatou, France

[21] Appl. No.: 120,828

[22] Filed: Nov. 16, 1987

[30] Foreign Application Priority Data

Nov. 17, 1986 [FR] France ............................. 86 15948

[51] Int. Cl.⁴ .............................................. G06K 7/10
[52] U.S. Cl. ................................................... 235/472
[58] Field of Search ......................................... 235/472

[56] References Cited

FOREIGN PATENT DOCUMENTS 0110085 10/1983 European Pat. Off. .
2494466 11/1980 France .

*Primary Examiner*—Harold L. Pitts

[57] ABSTRACT

The invention relates to an organization comprising a plurality of serving entries and a plurality of persons liable to come into contact with said serving entities, an installation for making a plurality of subfiles taken from a global file containing information relating to each person, each subfile being associated with a corresponding serving entity and being based on contacts made between said people and said serving entities. The installation includes the improvements of:

input means for making the individual records of said global file using information provided by each person;

associated and delivery means for associating an identification number with each record and for delivering a personal badge including a medium on which said identification number is encoded;

a plurality of read and data transfer units respectively associated with each of the serving entities and suitable for recording in respective memory units the identification numbers read from the badges of each of the persons making contact with the respective serving entities; and means for making said plurality of subfiles on the basis of the contents of said memory units and of said global file.

10 Claims, 2 Drawing Sheets

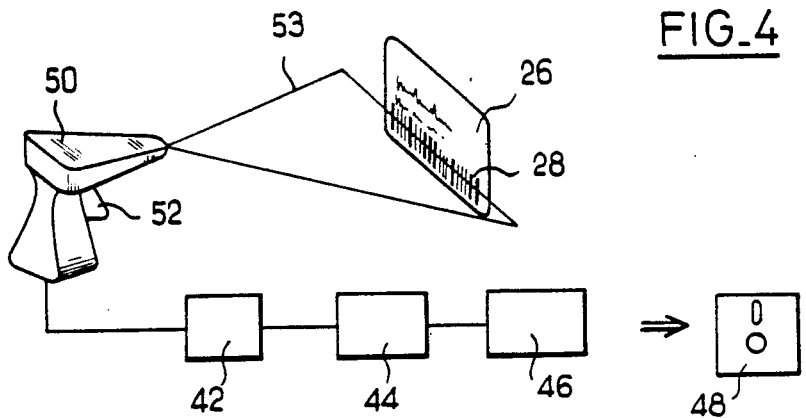
FIG_4
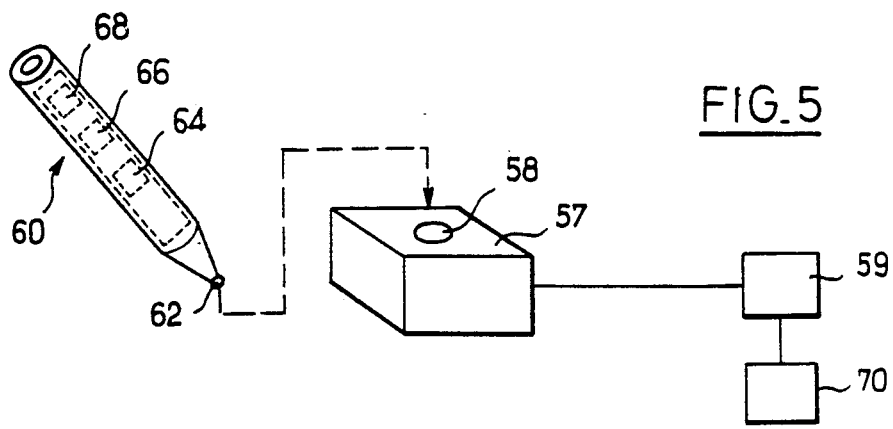
FIG_5
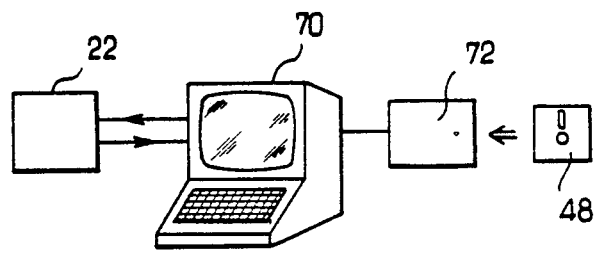
FIG_6

INSTALLATION FOR MANAGING THE "VISITOR" RESOURCE AT A TRADE SHOW, OR FAIR, OR THE LIKE

The present invention relates in general to computerized installations for facilitating the exchange of information between serving entities and the people that may come into contact with said entities. The term "serving entity" is used to cover, in particular, exhibitors or the like present at trade shows or other exhibitions or fairs, with the above-mentioned people then being visitors, members of the press, and personalities who may make contact with said exhibitors.

BACKGROUND OF THE INVENTION

In the prior art, it is common practice to give each visitor or the like an identity badge, either in advance or else when seeking entry to the show. Said badge may include a logo specific to the show in question together with data relating to the visitor, for example the visitor's full name. Badges are frequently issued only after visitors have provided data concerning their own identities, the identities of organizations they represent, their functions within such organizations, etc.

The main advantages of this practice are firstly to ensure that the people roaming the show premises are suitable, in order to avoid fraud and the presence of undesirable people, and secondly to have the opportunity, when issuing badges, of establishing a global visitor or personality file which can be of great value in particular when the show is a trade show having a well-targeted clientele.

However, in all types of show or fair, and regardless of whether entry is computerized or not, there remain constraints on all visitors whenever they make contact with an exhibitor. Obviously exhibitors, who are usually there for commercial reaons, are interested in a whole series of facts about each visitor, and as a result, whenever visitors make contact with exhibitors, they need to fill in questionnaires giving the desired information (organization, function, etc.).

Thus, during a visit to a show, visitors may fill in tens of exhibitor forms, each time giving essentially the same information, and this is in addition to any information that they may have given in order to gain access to the show.

Further, current systems making use of a global file for preselecting visitors (e.g. by posting invitations, etc.) are generally rigid in that no means are provided for verifying whether any given potential visitor shows interest in a particular show by visiting it regularly, or whether the visitor is no longer interested and never goes there. It will be understood that it would be advantageous to be able to remove such uninterested visitors from the file in order to update it, e.g. every year.

The present invention seeks to mitigate these drawbacks of the prior art and proposes an installation for managing the "visitor" resource (or like resources) in an exhibition such as a trade show or fair, thereby providing greater visitor comfort and also greater effectiveness in the contacts made between exhibitors and visitors.

A secondary object of the invention is to provide such an installation which makes it possible to provide improved monitoring of the interest which visitors show in a particular exhibition.

SUMMARY OF THE INVENTION

To this end, the present invention provides an installation for use in an organization comprising a plurality of serving entities and a plurality of persons liable to come into contact with said serving entities, the installation serving to make a plurality of subfiles taken from a global file containing information relating to each person, each subfile being associated with a corresponding serving entity and being based on contacts made between said people and said serving entities, the installation including:

input means for making the individual records of said global file using information provided by each person;

association and delivery means for associating an identification number with each record and for delivering to each person a personal badge including a medium on which said identification number is encoded:

a plurality of read and data transfer units respectively associated with each of the serving entities and suitable for recording in respective memory units the identification numbers read from the badges of each of the persons making contact with the respective serving entities; and means for making said plurality of subfiles on the basis of the contents of said memory units and of said global file.

Preferably, the medium provided on the badge for encoding the identity number consists in a bar code, and the means for reading and transferring data include at least one bar code reader.

BRIEF DESCRIPTION OF THE DRAWINGS

Embodiments of the invention are described by way of example with reference to the accompanying drawings, in which:

FIG. 4 is a diagram of a variant of the portion shown in FIG. 3;

FIG. 5 shows another variant of the FIG. 3 portion; and

FIG. 6 is a diagram of yet another portion of an installation in accordance with the invention.

DESCRIPTION OF PREFERRED EMBODIMENTS

Figure 1:
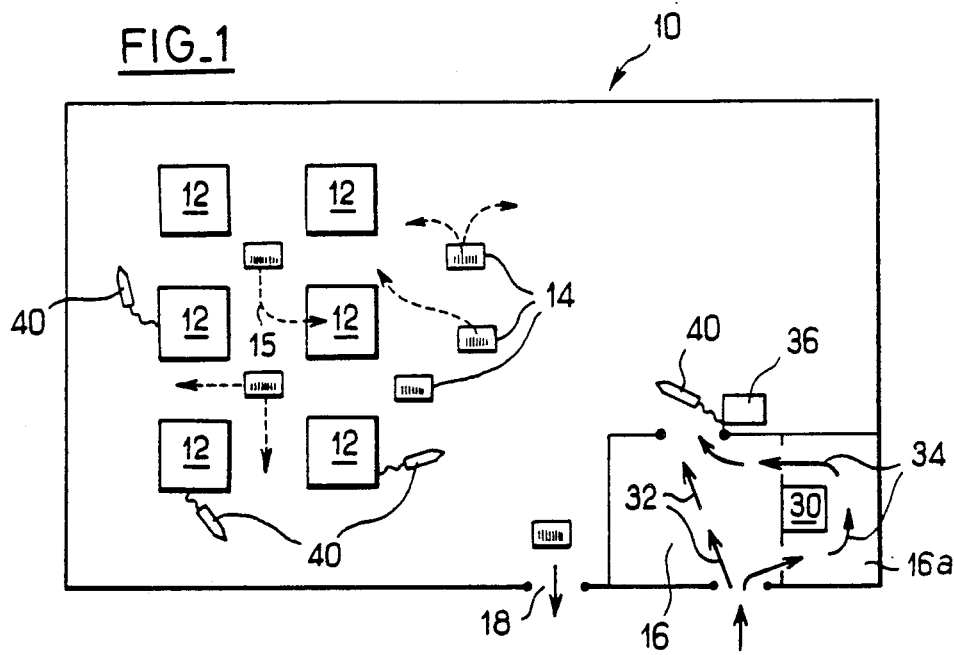
FIG. 1 is an overall diagrammatical view of an exhibition hall for a trade show or fair in which the installation of the present invention has been implemented.

With reference initially to FIG. 1, an enclosure such as an exhibition hall for trade fairs or shows or other occasions bringing large numbers of people together, in public or in private, is given an overall reference 10.

A plurality of stands 12 are provided within the enclosure 10 and serving entities are present on the stands.

The term "serving entity" is used herein for any suborganization of the event, and in particular for exhibitors, traders, reception facilities, seminar rooms, polling and inquiry services, etc.

A number of visitors 14 represented by data-carrying rectangles roam freely within the enclosure 10 and may visit any of the stands, as shown by arrow 15.

The enclosure 10 includes a reception and entry zone 16 and an exit 18. The entry zone 16 is organized so as to handle access for two main categories of visitors. A first category comprises "pre-registered" visitors who already have their personalized badges on arrival, the other category is non-registered visitors who must be identified and given personal badges during the access procedure, as explained below.

Pre-registered visitors are visitors whose details were already available prior to the opening data of the show, for example in a "visitors" file of a computer unit. The procedure consists in posting letters to these visitors telling them about the forthcoming show, and including forms with these letters for the visitors to fill in and return to the show organizer. On receiving a filled-in form, the organizer enters the data contained therein into the mass memory of a computer in the form of an individual record within a global file. The computer gives each individual visitor a unique identification number. A badge is then made. The badge may bear the name of the visitor, a logo for indicating which show or fair the badge relates to, and, in accordance with the invention, a data medium such as a bar code in which the above-mentioned identification number is encoded. The badge is then posted back to the visitor who keeps it for gaining entry to the show.

Visitors who are not pre-registered may also visit the show, but in this case they need to fill in forms which are identical or similar to those mentioned above so that their individual records can be made and their badges made immediately prior to their gaining access to the show.

Figure 2:
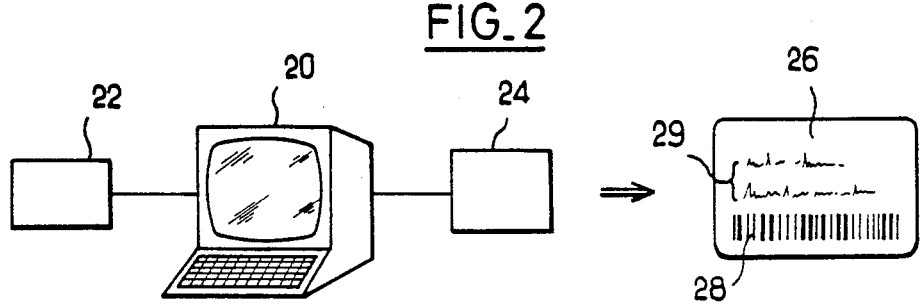
FIG. 2 is a diagram of a portion of the installation.

FIG. 2 shows a device for inputting and storing the information on a form and for making a badge. The device comprises a central unit 20 having a screen and a keyboard and connected to a mass memory 22 for the global file. The central unit provides each individual record which is created with a unique identification number. The device also includes a printer device 24 which receives the above-mentioned identification number from the central unit, together with the full name of the bearer and the bearer's organization, for example, and then prints on a blank badge 126 to mark a bar code 28 which encodes the said identification number and to mark a string of alphanumeric characters 29 (full name and organization).

Such a device is just as applicable to recording and printing a series of badges for pre-registered visitors as it is to performing these operations one-by-one in the entry zone 16 of the show. Thus, on FIG. 1, the entry zone 16 is shown as having a registry subzone 16a with a box referenced 30 representing a device of the type shown in FIG. 2, with an operator being associated with the device.

Naturally, several such devices may be provided, depending on the expected number of visitors, in order to keep waiting times as short as possible. When a plurality of devices are provided, they may either operate independently, in which case the data files made and stored by each of them are subsequently merged, or else they are organized in a local network, in which case the global file is built up directly.

Arrows 32 in FIG. 1 represent the through path taken by pre-registered visitors, whereas visitors arriving without a badge follow the path indicated by arrows 34.

Naturally, this access structure to the show could take some other form. In particular, it could additionally include one or more cash desks enabling visitors to pay an entry fee.

For "Trade Only" shows, each visitor record in the mass memory 22 may comprise the following items:
Visitor's name, address and telephone number;
Name of Organization;
Number of employees in the organization;
The organization's field of activity;
The visitor's function and department within the organization;
Topics of interest to the visitor.

In addition, the portion of the device as described above could also be adapted to handling different types of visitors. Thus, when an individual record is being input, the type of visitor may be entered as one of the items in the record: e.g.: ordinary visitor; journalist; exhibitor; VIP; etc. As mentioned below, this information may be encoded in the bar code 28 of the personal badge 26 adjacent to the identification number per se, or it may form an integral part of the identification number.

For example, the bar code 28 may contain ten encoded alphanumeric characters, three of them being reserved for the type of the visitor bearing the badge and the other seven constituting the identification number.

Between the entrance zone 16 of the show and the hall 10 per se, an installation in accordance with the present invention further includes a device for controlling access as shown diagrammatically at 36.

The purpose of this device is firstly to verify that visitors seeking to enter the show are authorized, i.e. that they have a badge and have therefore been registered, and secondly to create a list of the people who have actually visited the show.

Figure 3:
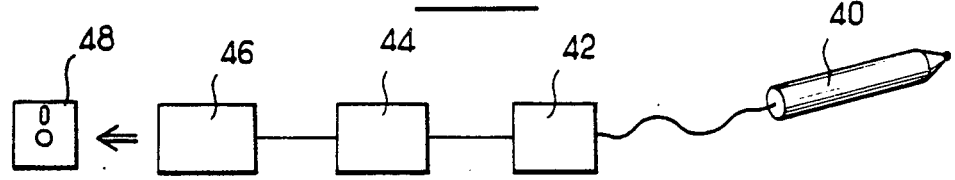
FIG. 3 is a diagram of another portion of the installation.

A first embodiment of this device is shown in FIG. 3. It comprises a light pen 40 connected via a decoding unit 42 to a central unit 44 which is associated with a nonvolatile memory 46 such as a floppy disk drive.

The light pen 40 is used by an operator to read the bar codes of the badges of all visitors seeking entry, and the device records the succession of identification codes decoded by the unit 42 in its memory 46, and this continues for the duration of the show.

The memory thus contains the identification numbers of all of the people who have visited a given show, and this information can be used, for example, to update the file of pre-registered visitors, and in particular to remove visitors therefrom who do not appear to be keen enough.

Further, processing means may be provided to act on said stored list in order to associate data concerning the date, the time and possibly the frequency of visits with each identification number. This type of information can be used either for statistical purposes, or else for subsequently selecting particular types of visitor from the global "visitor" file.

FIG. 4 shows a variant embodiment of the FIG. 3 device. This device has a read pistol 50 with a trigger 52 instead of a light pen.

An inspector wishing to read the bar code on a visitor's badge pulls the trigger 52, thereby causing a flat laser beam 53 to be projected for the purpose of reading the bar code 28 all at once.

The advantage of this pistol device lies in the fact that each visitor's identification code (which may be fixed on the chest, for example) can be read at a distance unlike using a light pen which must necessarily be pressed directly against the badge which visitors may find disagreeable.

In both of the above cases, the decoding unit 42 may include checking means which, once the code has been properly read and decoded, generate a sound or light signal to tell the inspector that the person is free to enter the enclosure 10.

Another variant of the access controlling device (not shown) could include a bar code reader unit without an operator, in which case the visitor inserts the badge into the reader in order to unlock a turnstyle type device for controlling access when the identification code has been read. The main advantage of this solution lies in the reduction in personnel, but its drawback lies in each visitor needing to remove the badge and insert it in a reader unit in order to gain entry.

Regardless of the particular configuration of the device for inspecting and recording accesses, and in the special case of the bar code including information relating to the nature of each visitor, as mentioned above, the device may be used to inform a special reception unit located immediately after the badge reader whenever special visitors such as VIPs or journalists are arriving.

As a result, the only people roaming the show are people provided with personalized badges enabling them to be immediately identified, for example by their names and the names of the organizations to which they belong, which badges also make it possible (by reading the personalized bar code thereon and appropriate processing making use of the global "visitor" file) to gain access to all or part of the information contained in the corresponding record in the global file.

An important advantage of this organization in accordance with the present invention lies in a high degree of security for each visitor: the information provided when filling in the form remains confidential to the show organizer and if a badge is lost or stolen nobody else can gain access to that information; only the contents of the bar code itself might be read, but this contents is meaningful only to people who have access to the global file, which access is advantageously protected by conventional methods.

In accordance with the invention, some or all of the exhibitors have a bar code reader device available on their stands 12 as shown diagrammatically by light pens 40 in FIG. 1.

These reader devices may be of the type shown in FIGS. 3 or 4. However, a particularly advantageous embodiment of a reader for exhibitors is shown in FIG. 5. This device is of the light pen type and comprises a generally cylindrically shaped portable wand 60. One end of the wand is provided with an opening 62 associated with an internal optical bar code reader (not shown). The wand also houses (as shown by dashed lines) a central unit 64 which also acts as a decoder of the bar codes read, and a read/write memory 66 having a capacity of several kilobytes, for example, and backed up by a rechargeable battery 68. Such a portable optical reader with built-in storage is known, for example the so-called "Datawand" manufactured by the U.S. company MSI.

This light pen is provided to each exhibitor (or to only some of them, depending on how the show is organized) who can therefore read and store the identity code of some or all of the visitors visting the stand, which naturally requires the agreement of the visitors prior to reading.

Depending on the capacity of the memory 66 and the number of visitors to the stand, such a wand may be used for storing identification codes over a single day or possibly over the entire duration of the show.

When the bar code readers on the stands 12 are of the type shown in FIGS. 3 or 4, the memory medium 48 for storing the identification codes that are read and decoded may be constituted by any conventional device, such as a floppy disk (in which case the central unit 44 is associated with a suitable drive), or else a read/write memory cartridge backed up by a rechargeable battery.

Here again, the central unit may include processing means for associating each identification code with the date and time of the visit, and optionally with the frequency of visits (when visitor badges are read systematically on entrance to a stand and visitors call several times).

Thus, exhibitors whose stands are equipped with one or more read and storage devices have at their disposal, e.g. at the end of the day or at the end of the show, to a data medium (wand 60, floppy disk 48, etc.) containing the identification codes of all of the visitors whose badges have been read. In order to avoid errors during subsequent processing of this information, data identifying the particular exhibitor may be written in the data medium by physical means or preferably by digital means (and optionally with tamper-proofing means), in a manner described below. Preferably, when the data medium consists in an integrated light pen and storage device 60 as described above, the wand includes a read only memory having an unalterable serial number therein, which serial number can be used for identifying the exhibitor.

Another solution could consist, for example at the beginning of each day in loading the identification code of the exhibitor as the first item in the memory for storing visitor identification codes, and this can be done very easily by reading the bar code on the exhibitor's own badge. This solution is advantageous in that it avoids the visitor identification codes collected by the reader being useable by unauthorized persons.

Finally, the installation in accordance with the present invention includes means for providing exhibitors who have collected visitor identification codes in the manner described above with a subfile derived from the global "visitor" file mentioned above and containing records relating to those people whose identification codes have been collected. FIG. 6 shows a central unit 70 having a screen and a keyboard, for example a microcomputer, which communicates with the mass memory 22 described in reference to FIG. 2 and which contains the global "visitor" file, having records relating to pre-registered visitors and to those visitors who were registered as they entered the show.

The central unit 70 is associated firstly with read means for reading the contents of the data media associated with each exhibitor, and secondly with software means for creating a personalized subfile on the basis of the identification codes read in this way. When the visitor identification code storage media are constituted by floppy disks, the read means may be constituted by a floppy disk drive referenced 72.

When the data media are portable wands 60 as described with reference to FIG. 5, then the central unit 70 is connected to a special reader for this type of wand, which reader (as shown in FIG. 5) is in the form of a housing 57 including an orifice 58 into which the wand 60 may be partially inserted. Means for providing electrical communication via connectors, or magnetic communication, or optical communication between these two items are provided, although not shown, firstly in order to copy the contents of the memory 66 in the light pen 60 into the central unit 70 via an interface 59, and secondly in order to clear the memory 66 to prepare the wand 60 for reuse.

In general, regardless of the particular type of portable data medium used for the identification codes, it is advantageous for the medium to be cleared after it has been copied into the memory of the central unit 70.

In addition, the personalized subfile for each exhibitor may be presented either in the form of a listing of all or some of the data relating to each individual and contained in the corresponding record, or else in the form of a floppy disk containing said subfile in a form which is accessible to and usable by data base software, assuming that the exhibitor has a suitable comptuer infrastructure.

Thus, the invention makes it possible to considerably simplify relations between a set of visitors and exhibitors, or more generally between a set of persons who may make contact with serving entities made available to said persons. Visitors no longer have to fill in a new form on each stand, and a simple bar code read operation of their name badges takes the place of form filling on each occasion. This results in a considerable saving of time during the show both for the visitors and for the exhibitors, and subsequently for the exhibitors who have access to an easily usable file relating to contacts made during the show.

Naturally, the present invention is not limited to the embodiments described above and shown in the drawings, but includes any variant or modification which may occur to the person skilled in the art.

In particular, as a function of the size of the show or other meeting (the number of exhibitors), of the number of visitors, of the show's duration, etc., the various devices constituting the installation of the invention are appropriately dimensioned, and they are provided in appropriate numbers.

Further, the person skilled in the art could naturally devise various other forms of encoding each visitor's identification number. For example, the badge could be of the magnetic type. In this case, the printer device would be replaced by a unit for writing on the, or each, magnetic track on the badge, and each stand would be equipped with one or more read only units for the magnetic badges.

Another medium which could be used for the identification number is the read/write memory of a memory card. In similar manner, if this type of card is used, appropriate write only means and read only memory may be provided in association therewith.

Finally, a type of data coding that could be suitable for application in accordance with the present invention consists in optical coding known under the registered trademark "Softstrip" in accordance with European patent applications published under the Nos. 0 216 859 and 0 218 634 in the name of Cauzin Systems.

It is clear that the invention is applicable not only to trade fairs and shows, etc., but to any type of event such as an exhibition, a seminar, a political meeting, or a sporting occasion, and this list is by no means exhaustive.

It may be observed in this respect that an installation in accordance with the invention may be used in a wider context in association with other types of information.

A first example of how application may be extended consists in associating each identification code collected on a stand by means of a light pen or the like with other information, and in particular with information relating to the topics which interest the badge bearers, e.g. the products they are interested in, etc.

Technically several solutions can be deviced for providing this function.

The first such solution which applies when the identification code read from a badge is immediately transferred into the memory of a local microcomputer, consists in inputting data (e.g. digital data) e.g. using the computer keyboard, into various memory fields associated with a given code and representing specific topics of interest, goods, . . . .

When the subfile is subsequently prepared for the particular exhibitor, this additional information is naturally taken into account, for example by incorporating it in the corresponding visitor record.

Another solution which is highly advantageous when badges are read on a stand by means of a portable light pen with an incorporated backed-up memory, consists in using the pen after it has read the badge to read one or more additional bar codes provided, for example, on a catalog and encoding information concerning topics or interest, goods, . . . .

This additional data can be taken into account as mentioned above when the subfile is being made.

Another example of an extension of the present invention which is particularly appropriate for managing seminars or the like, consists in providing each visitor badge with authorization data (either in the clear or in encoded form) indicating, for example, the references of the seminars in which the badge bearer is authorized to participate.

For example, an optical reader at the entrance to a seminar hall could thus be used simultaneously to verify that the bearer is authorized to participate in the seminar and also to store the identification codes of all of the people who have actually participated, for example for the purpose of creating a subfile similar to that provided in the above description to an exhibitor or to a server.

Finally, it should be observed that the invention may be used most advantageously in the context described when surveys or polls are being performed. It then becomes possible to avoid manually copying onto a form items of information which are already contained in the central data bank in association with the identification code of each visitor participating in the poll. Two solutions may be envisaged in this respect:

When the identification code is displayed in the clear on the badge, in addition to the bar code, the inquirer only has to copy down the ID code onto the form. At the end of the inquiry, information contained in the data bank relaing to each identification code under consideration is associated, preferably during computer processing of the survey information, with the specific items collected by the inquirer.

When the identification code appears in encoded form only, e.g. using bar codes or some other form of code, then the inquirer is provided with a portable reader suitable for reading the code of each person questioned and capable either of displaying it on an appropriate display so that it can then be copied down by hand on the inquiry sheet, or else of then reading a special bar code on the particular inquiry sheet so that the two codes are associated in the memory of a portable reader for subsequent processing.

I claim:

1. In an organization comprising a plurality of serving entities and a plurality of persons liable to come into contact with said serving entities, an installation for making a plurality of subfiles taken from a global file containing information relating to each person, each subfile being associated with a corresponding serving entity and being based on contacts made between said people and said serving entities, the installation comprising:

input means for making the individual records of said global file using information provided by each person;

association and delivery means for associating an identification number with each record and for delivering to each person personal badge including a medium on which said identification number is encoded;

a plurality of read and data transfer units respectively associated with each of the serving entities and suitable for recording in respective memory units the identification numbers read from the badges of each of the persons making contact with the respective serving entities; and means for making said plurality of subfiles on the basis of the contents of said memory units and of said global file.

2. An installation according to claim 1, wherein the medium provided on the badge for encoding the identification number consists in a bar code, and wherein the read and data transfer units include at least one bar code reader device.

3. An installation according to claim 2, for an organization in which said serving entities are provided in enclosed premises including an entry zone, and wherein the installation further includes bar code reading and identification number storing means located in said entry zone and controlling the access of persons to said premises.

4. An installation according to claim 3, wherein at least a portion of the input means and of the association and delivery means are provided in said entry zone.

5. An installation according to claim 2, wherein the association and delivery means include a dot matrix printer for delivering badges.

6. An installation according to claim 2, wherein the identification number encoded in the bar code is associated with additional information relating to the nature of the bearer.

7. An installation according to claim 2, wherein the bar code reader means include a self-contained portable reader which also constitutes said memory unit.

8. An installation according to claim 1, wherein the subfiles are provided to the respective serving entities in one of the forms including listings and floppy disks.

9. An installation according to claim 1, wherein the memory units also contain means for identifying the respective serving entities.

10. An installation according to claim 1, wherein the records of the subfile associated to at least one serving entity further include data collected by serving entity.

* * * * *